Figure 1:
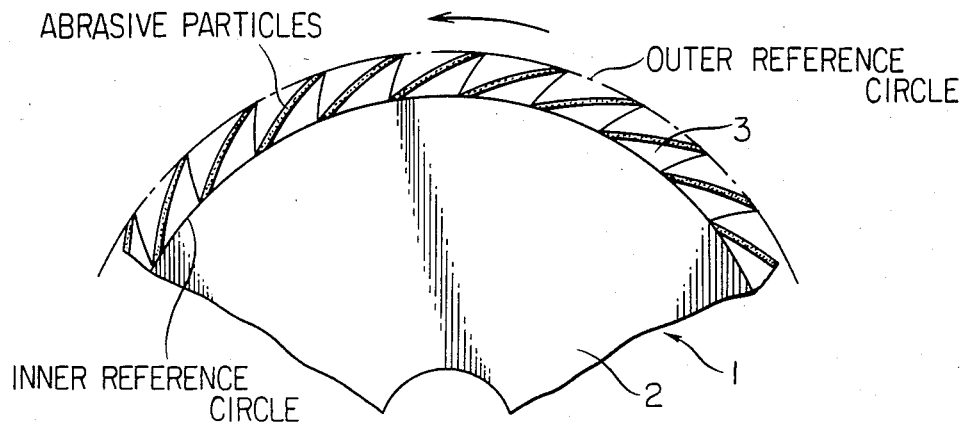

United States Patent [19]

Ishizuka

[11] Patent Number: 4,637,370
[45] Date of Patent: Jan. 20, 1987

[54] ROTARY SAW BLADE

[76] Inventor: Hiroshi Ishizuka, 19-2, Ebara 6-chome, Shinagawa-ku, Tokyo, Japan

[21] Appl. No.: 782,446

[22] Filed: Oct. 1, 1985

[30] Foreign Application Priority Data

Oct. 8, 1984 [JP] Japan .................................. 59-211086

[51] Int. Cl.⁴ .............................................. B28D 1/04
[52] U.S. Cl. .................... 125/15; 51/206 R; 83/825
[58] Field of Search ................. 51/206 R; 125/15, 12, 125/13; 83/825, 835, 852

[56] References Cited

U.S. PATENT DOCUMENTS

| 836,910 | 11/1906 | Zerfas | 125/15 |
| 1,469,985 | 10/1923 | Bath | 51/206 P |
| 2,736,312 | 2/1956 | Goldman | 125/18 |
| 3,788,182 | 1/1974 | Tyler | 83/835 |

FOREIGN PATENT DOCUMENTS

| 81063 | 5/1984 | Japan | 125/15 |
| 288636 | 11/1971 | U.S.S.R. | 125/15 |

Primary Examiner—Harold D. Whitehead
Attorney, Agent, or Firm—Larson & Taylor

[57] ABSTRACT

A rotary saw blade, comprising a series of outward tapering toothlike radial projections on and around a circular core of a base plate of metal, each of said projections comprising a leading surface which is inclined at an acute angle to the periphery of the core and deposited with abrasive particles held in a layer comprising metal.

9 Claims, 8 Drawing Figures

SAW WITH ROUNDED PROJECTION TOPS

ROTARY SAW BLADE

The present invention relates to a rotary saw blade and, in particular, to such blade deposited with diamond, cubic boron nitride (cBN) and other "super abrasive" materials and capable of efficiently cutting tiles, bricks and other hard and brittle materials of ceramic, glass, granite and carbon.

Rotary saw blades are known and utilized, which comprise diamond or other super abrasive particles held by or in a layer of metal secured on the periphery of a base plate or core of, usually, steel. The layer is formed by powder metallurgical technique and arranged around the base plate either continuously or in series of segments, or arcuate tips, at intervals with gaps between adjacent segments, said gaps being effective to remove pulverized work from the kerf.

Electrodeposition is also employed for forming and securing such abrasive-containing layer on the periphery of a core, either continuous or divided by slits.

Parameters such as base plate dimensions, the grain size and concentration of abrasive particles and the composition of binder metal are selected from a wide variation in accordance with such factors as the material and dimensions of the work.

Although available for cutting a wide variety of work materials from stone and concrete structures to semiconductors, conventional blades suffer from some drawbacks: continous types require unfavorably a large power input to drive them over an intense frictional load due to the large area of contact with the work, and they also are vulnerable to dulling of abrasive particles and loading of the abrasive layer with pulverized work, so the process has to be interrupted by frequent dressing for re-creating fresh cutting edges. Segment types can exhibit some improvement as the gaps between adjacent segments are helpful for removal of the pulverized work during the process, while the intermittent engagement with the work causes a shock which may permit the segment to promote the self-sharpening of the edges. Nevertheless, the blades cannot work efficiently without rather a high power input.

Therefore one of the principal objects of the invention is to provide a rotary saw blade capable of achieving improvement in both dust removal and edge sharpening as well as a substantially decreased frictional resistance, by eliminating the above said drawbacks inherent to conventional types of saw blade.

According to the invention there is provided a rotary saw blade, comprising a series of outward tapering toothlike radial projections on and around a circular core of a base plate of metal, each of said projections comprising a leading surface which is inclined at an acute angle to the periphery of the core and deposited with abrasive particles held in a layer comprising metal.

In the invention the tooth, or the toothlike projection, optimally has a leading surface inclined at an included angle of or smaller than 60° to the periphery, or more exactly to the tangential thereto, of the circular core, said surface being either plane or somewhat curved at tangentials of or smaller than 60°, while the trailing end surface may be arranged conveniently at something in the vicinity of 90°.

Such outward tapering tooth may have a pointed or rather rounded top; anyhow it will have a gradually widening round top as it wears in a cutting process.

Abrasive particles of diamond, cubic- (cBN) or wurtzite type (wBN) boron nitride are deposited on the surface of the teeth, essentially over the leading face and, possibly, a minor amount on the flanks in adjacency. They may be fixed on a base plate by electroplating or as contained in a powder metallurgically preformed tip which is then brazed along the front end of the tooth; or alternatively they can be secured on the base plate by conventional hot press technique at the same time as they are cured.

Clearance is given between every adjacent teeth, as deposited with the abrasive particles, so as to exhibit, in a view perpendicular to the axis, an area of at least 30% the total area defined between two reference circles: one passing through the outermost point of the teeth and the other, through the innermost foot point thereof.

Blank teeth are arranged in such series that the leading end surface of each tooth originates in contact with the trailing end of the predecessor, or at a small spacing therefrom. Here the notch or clearance thus formed between adjacent two teeth runs substantially in parallel with the axis.

Such teeth may be conveniently arranged in a common plane within the thickness of the circular core, although a somewhat zigzag arrangement across the thickness is available as well as an alternately inclined tooth arrangement relative to the core every one or more.

Both work cracking tendency and cutting efficiency can improve with a decreasing width of the tooth, while the latter has correspondingly decreasing rigidity. Thus it has been found optimal that in general the tooth be given an initial relative height of or smaller than 1/10 for rather a small saw blade and, for larger ones, of or smaller than 1/15 the outer diameter of the base plate with the teeth included.

The super abrasive materials applicable to this invention include diamond, natural or synthetic, and cubic and/or wurtzite type boron nitride. It is desirable that the particles have highly crystallized structures with least inner distortion, so as to be well resistant to the intense impulsive load in a cutting process.

With the blades of the invention in which abrasive particles are arranged over the surface inclined to the periphery or the direction of rotation of the blade, particles in the outermost area of each tooth comes in contact with the work to abrade it; such area gradually proceeds inward as abrasive particles, as worn, pop out from the matrix layer and, subsequently, the tooth substrate along with the metallic layer has been abraded. The abrasive particles are provided in plenty on the increased area of inclined tooth surfaces and sharper particles are allowed to come out to the working surface continually in the way described above, so a high cutting efficiency is achievable over a long service life until the cutting resistance reaches to a practically undurable level because of a substantial increase of the thus exposed area without abrasive particles of the tooth substrate.

Obviously, electrodeposition technique may be preferred for better physical condition of contained abrasive particles, while the tipped blades are favored for increased service lives.

Whether the particles are deposited directly by electrodeposition or as comprised in tips, only a fraction locating in the front are effective in forward cutting the work, while other fractions on the flanks serve principally to widen the kerf laterally, so an excessive volume thereof abrasive particles unfavorably results in an increased contact friction at work without appreciable contribution to the cutting efficiency. Thus the less the volume on the flanks, the more economically advantageous.

Figure 3:
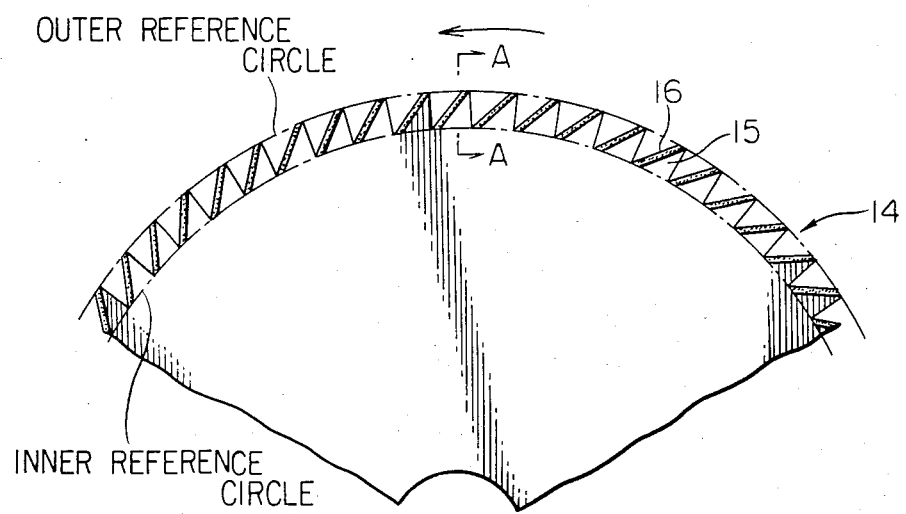
Figure 2:
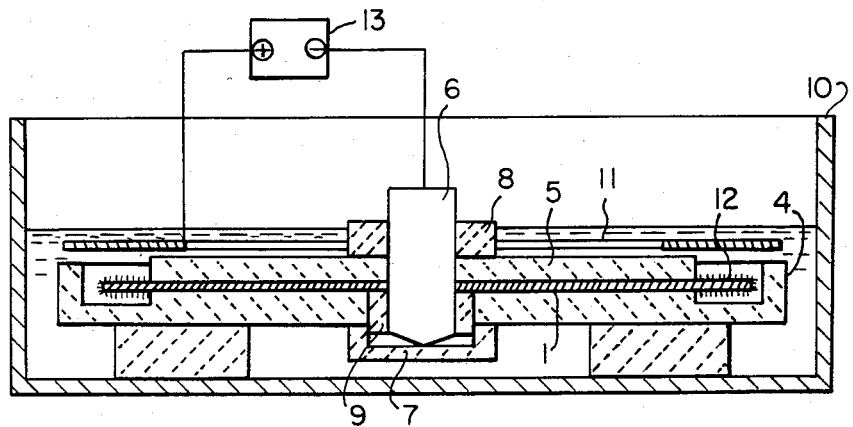
Figure 4A:
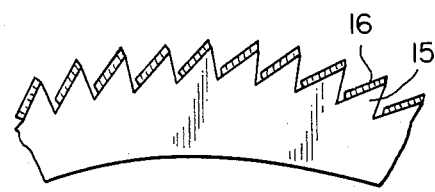
Figure 5A:
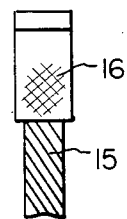
Figure 4B:
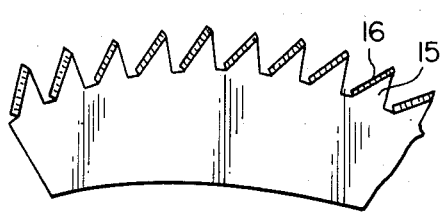
Figure 5B:
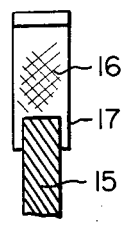

Now the invention will be described more in particular with reference to the attached drawing which is given for the purpose of illustration only, of which:

FIG. 1 is a fragmental view of a rotary saw blade of the invention, with abrasive particles electrodeposited, designed to be rotated in the direction indicated with the arrow, FIG. 2 is a schematic illustration of an arrangement for electrodepositing abrasive particles applicable to the invention, FIG. 3 shows a fragmental view of another saw blade of the invention, with tipped teeth, to be rotated as the arrow indicates, FIGS. 4a and 4b shows fragmentally a few examples of the relative arrangement of the tip and tooth, and FIGS. 5a and 5b shows a few examples of tip geometry enlarged as viewed in section along A—A on FIG. 3.

Figure 6:
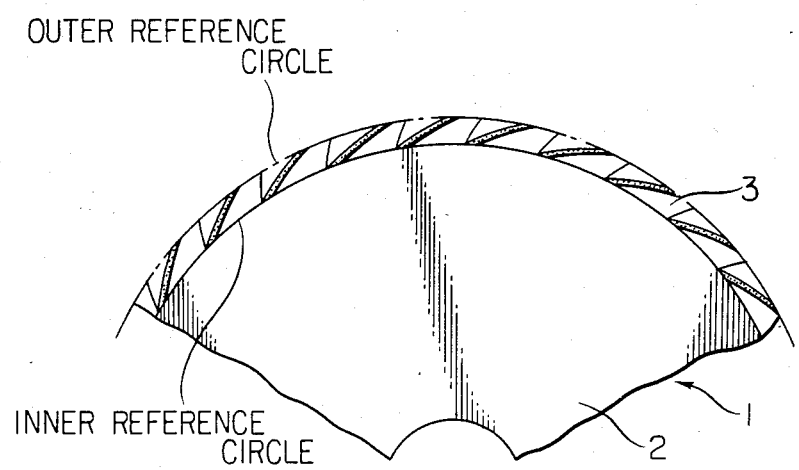

FIG. 6 shows a fragmental view of another saw blade of the invention, having rounded projection tops.

A base plate 1 of steel comprises a circular core portion 2 and a serrated portion consisting of a series of toothlike projections 3. Optimally the plate 1 as s whole is cut out from a single sheet of a thickness on the order of 1/200–1/100 the O.D. of the blade. The serrated portion may have a decreased thickness when used for electrodeposition.

The base plate 1 as cleaned is laid on a dish 4, tightly covered with an insulative disk 5, so that the teeth alone are to be open to electrolyte. The flanks of a tooth also may be partly covered with a suitable mask (not shown) as desired in order to minimize the rather unfavorable fraction of particles there as described previously. A threaded bolt 6 of electrical conductive material, such as metal, is inserted to contact with the plate 1, mated with inner threaded rings 7, 8 of insulative material, further insulated at the bottom with a plastic cap 9. The set is as a whole placed in a container 10 and dipped in a bath of electrolyte. An annular sheet 11 of nickel, for example, is placed in opposition over the teeth, on which particles 12 of diamond, for example, have been spreaded. Direct current is supplied from a source 13 through a wiring connected to the bolt 6 and metal 11, thus conducting a standardized electrodeposition.

In the manufacture of tipped saw blades, on the other hand, abrasive particles are scattered at normal concentrations in a powder of binder metal comprising, for example, copper, iron, or WC and Co, and are pressed into an axial tip by standard powder metallurgic technique. The tip may comprise additionally a minor proportion of filling material for better distribution of the particles. The base plate 14 in FIG. 3 comprises on each tooth 15 thereof tips 16 thus produced and deposited by brazing; or alternatively a press-formed mass comprising such abrasive and binder metal may be heated on the plate 14 so as to effect the both processes simultaneously of the forming and brazing.

Tips may be arranged either over the whole length, as shown in FIGS. 3 and 4-b, or partly in an upper portion as in FIG. 4-a, without or with some extention 17 over the tooth flanks for better holding as in FIGS. 5 a and b, respectively.

EXAMPLE 1

A base plate was cut out of a sheet of JIS SK-5N steel to comprise inward a circular core, 100 mm across and 1 mm thick, and 32 triangular teeth 0.8 mm thick and 5 mm high, with a leading surface plane and inclined at 58° to the periphery of the core. The base plate was under-coated with an electrodeposited nickel layer at the front end and a little area of the flanks, in adjacency, of each tooth, with the remaining portion covered with plastic parts. The plate was then spreaded at the layer with a 40/50 mesh powder of synthetic diamond, grade IMS-B, manufactured by Tomei Diamond Industry of Japan, a fraction closest to the plate was trapped on the tooth surfaces by a thin electrodeposited layer of nickel, while the balance fraction was removed from the plate, and then the layer was increased to a proper level for securing the hold of the particles. As a result 4.7 carats of diamond was held on the base plate to an overall tooth thickness of 1.8 mm.

For the purpose of comparison a layer comprising 8.0 carats of diamond in the same grade and same size as above was formed by nickel electrodeposition over all the area outside the diameter of 100 mm of a circular base plate of the same grade steel with an O.D. of 110 mm and a thickness of 1 and 0.8 mm inside and outside the diameter of 100 mm, respectively.

Both saw blades were subjected to the cutting of ceramic tiles, each of dimensions 108×108×10 mm, under the parameters:

Blade peripheral speed: 4100 m/min.

Mode: wet; cooled with civil water at a rate of 7 liters per minute

The evaluation was made in terms of the relative required power input as well as the total length of cut achieved by the time when they became incapable of any advance due to a substantially increased resistance. The results are:

|  | Invention blade | | Control blade |
| --- | --- | --- | --- |
| Cutting speed m/min. | 2.0 | 1.5 | 1.2 |
| Total length of cut (m) | 42.4 | 135 | 15 |
| Relative required power input (WHr/100 cm²) | | 51.2 | 80 |

As apparent, the blade of the invention could achieve at a speed 25% faster a service life 9 times, and at a speed 1.7 times faster, a service life 3 times as long as the control product could.

EXAMPLE 2

A base plate made of the same grade of steel as above and basically illustrated in FIG. 3 was used, which comprised a circular core 200 mm across and 64 triangular teeth, each measuring 10 mm in height, with a front surface, plane and inclined at 50° and a rear end perpendicular to the periphery of the core. The corresponding number of tips, 2.7×2.7×12.5 mm large, were prepared from a diamond in the same grade and same size as in Example 1 at a concentration of 20, powder of bronze, and a minor proportion of filler, and were welded with silver braze.

For comparison 25 tips, 2.7×2.7×20 mm large, were made with the same composition as above and soldered to the periphery of a circular base plate 200 mm across and 1.9 mm thick of the same grade steel as above, leaving a gap some 5 mm wide between every adjacent tips.

The both saw blades were evaluated in cutting the tiles under the similar parameters to those used in Example 1, but at a peripheral speed of 4000 m/min. The results are:

|  | Invention blade | Control blade |
| --- | --- | --- |
| Cutting speed (m/min.) | 1.2 | 1.2 |
| Total length of cut (m) | 34 | 8 |
| Relative required power input (WHr/100 cm$^2$) | 72 | 105 |

Apparently from this comparison, the blade of the invention exhibited an increased service life by about 4 times, with the relative required power smaller than 70% that with the control.

I claim:

1. A rotary saw blade, comprising a series of outward tapering toothlike radial projections on and around a circular core of a base plate of metal, each of said projections comprising a leading surface which is inclined at an angle not greater than 60° to the periphery of the core and deposited with abrasive particles held in an electro-deposited layer of metal.

2. The saw blade as claimed in claim 1, in which said projections comprise pointed tops.

3. The saw blade as claimed in claim 1, in which said projections comprise rounded tops.

4. The saw blade as claimed in claim 1, in which said leading surface is plane.

5. The saw blade as claimed in claim 1, in which said leading surface is curved with tangentials not greater than 60° to the periphery of the core.

6. The saw blade as claimed in claim 1 in which said projections are arranged at such intervals that, as viewed perpendicular to the axis, the total open space which is defined by two reference circles, one passing through the outermost point of the projections and the other, through the innermost foot point of the projections, and the opposite sides of adjacent projections, is no less than 30% the total area defined by such reference circles.

7. The saw blade as claimed in claim 1, in which said abrasive particles substantially consist of diamond.

8. The saw blade as claimed in claim 1, in which said abrasive particles substantially consist of at least one selected from cubic- and wurtzite-type boron nitrides.

9. A rotary saw blade comprising a series of outward tapering toothlike radial projections, each of which comprises a leading surface inclined at an angle not greater than 60°, along which a powder metallurgically formed tip comprising particles of abrasive is secured, said abrasive consisting of at least one selected from diamond and cubic- and wurtzite-type boron nitrides.

* * * * *